A. PHINNEY.
FUEL SUPPLY INTAKE CONNECTION.
APPLICATION FILED JAN. 2, 1917.
1,288,982.
Patented Dec. 24, 1918.
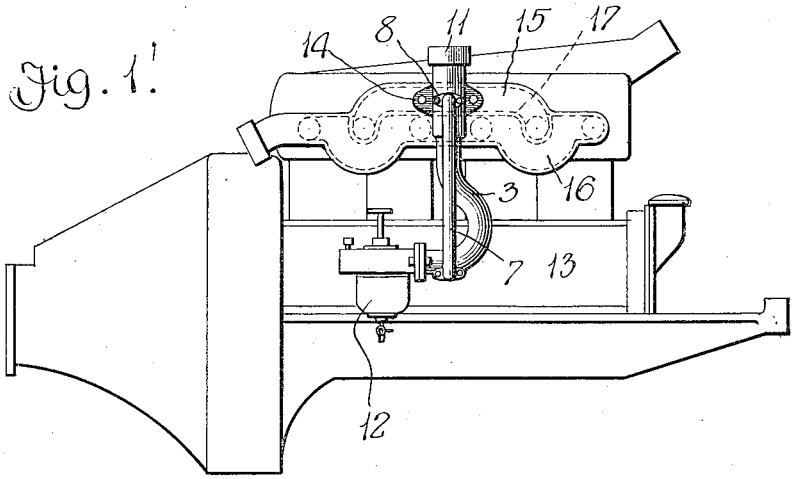
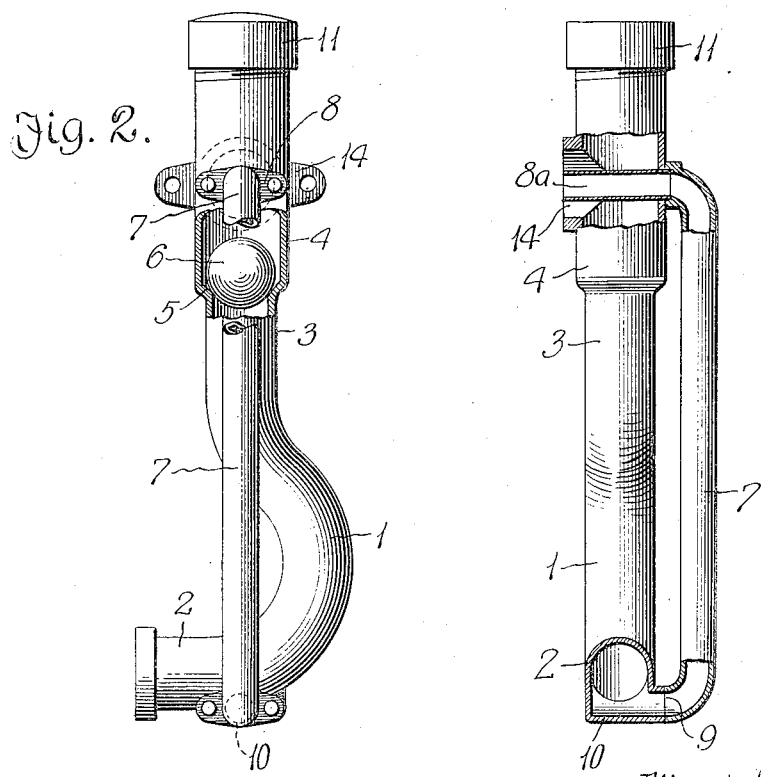
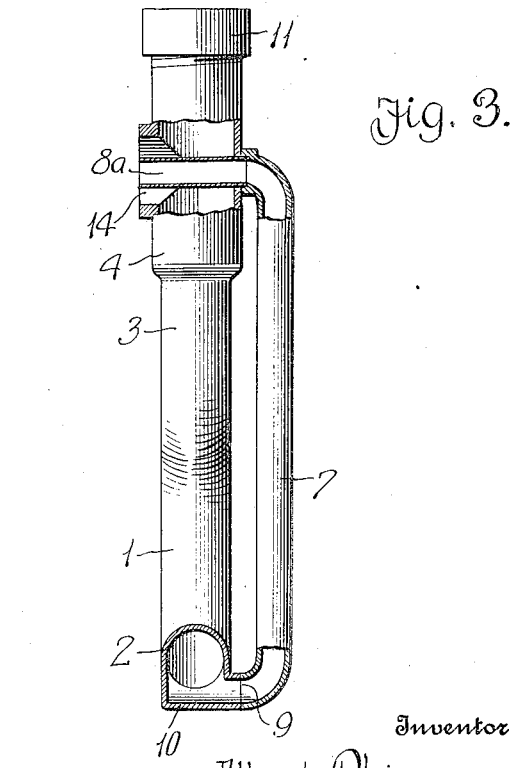
Witness
Chas. W. Stauffer
Karl H. Butler
Inventor
Albert Phinney,
By
Attorneys

UNITED STATES PATENT OFFICE.

ALBERT PHINNEY, OF DETROIT, MICHIGAN, ASSIGNOR TO CHARLES McCALL, OF DETROIT, MICHIGAN.

FUEL-SUPPLY INTAKE CONNECTION.

1,288,982. Specification of Letters Patent. Patented Dec. 24, 1918.

Application filed January 2, 1917. Serial No. 140,033.

*To all whom it may concern:*

Be it known that I, ALBERT PHINNEY, a citizen of the United States of America, residing at Detroit, in the county of Wayne and State of Michigan, have invented certain new and useful Improvements in Fuel-Supply Intake Connections, of which the following is a specification, reference being had therein to the accompanying drawings.

This invention relates to a fuel supply intake connection for internal combustion engines, and has special reference to that type of engine used as a power plant of a motor vehicle and utilizing gasolene or a similar fuel as a source of power for the engine.

The primary object of my invention is to provide a novel intake connection which may be easily and quickly installed in connection with engines now in use having a carbureter and an intake manifold. The intake connection is adapted to establish communication between the carbureter and the intake manifold and provide a main conduit and an auxiliary conduit. The main conduit provides a constant communication between the carbureter and the intake manifold so that when starting the engine or operating the same at low speed, for instance, five or six miles per hour for the automobile equipped with the engine, a sufficient quantity of explosive mixture may be obtained and drawn into the cylinders of the engine. The auxiliary conduit is controlled by an automatic valve and said conduit is only brought into active use after a predetermined speed, say after five or six miles per hour is obtained, thereby placing the engine in communication with an additional supply of fuel sufficient for operation at high speed.

Another object of my invention is to combine intake and exhaust manifolds of an internal combustion engine so that walls of the intake manifold will be heated by exhaust gases in the exhaust manifold, and in consequence of this arrangement any fuel admitted to the intake manifold in unvaporized condition will be immediately vaporized before being drawn into the cylinders of an engine. Heating the intake manifold places an explosive mixture passing therethrough in better condition for combustion and insures a more intimate commingling of combustible fuel particles.

A further object of my invention is to provide a fuel supply intake connection that is simple in construction, durable, easy to clean, and highly efficient for various types of explosive engines.

The above are a few of the objects obtained by a mechanical construction that will be hereinafter described and then claimed, and reference will now be had to the drawing, wherein—

Figure 1 is a side elevation of a conventional form of internal combustion engine provided with structures in accordance with my invention;

Fig. 2 is an enlarged front elevation of an intake connection, partly broken away and partly in section, and Fig. 3 is a side elevation of the same partly broken away and partly in section.

The fuel supply intake connection comprises an auxiliary conduit 1 having a lateral portion 2 at the lower end thereof and a vertical portion 3 at the upper end thereof terminating in a cylindrical valve chamber 4 of greater diameter than the conduit 1. To provide a smooth and uninterrupted passage to the conduit from the lateral portion 2 to the vertical portion 3 it is preferable to form the conduit on a compound or ogee curve, as best shown in Fig. 2, and by making the valve chamber 4 of greater diameter than the vertical portion 3 of the conduit, an annular valve seat 5 is formed at the juncture of the valve chamber with the conduit, said valve seat accommodating a check or gravity valve 6 preferably in the form of a spherical body or ball. The valve 6 has the same function as a ball check and is adapted to remain seated until a sufficient suction within the valve chamber 4 causes the same to be elevated, thus establishing direct communication between the chamber 4 and the lateral portion of the auxiliary conduit.

Besides the auxiliary conduit 1 there is a main conduit 7 formed by a pipe of less diameter than the auxiliary conduit 1. The upper end of the main conduit 7 is connected to the valve chamber 4 above the valve seat 5, as at 8, and communicates with a tube 8ᵃ extending transversely of the valve chamber, said tube being a continuation or end of the main conduit. The lower end of the main conduit is connected, as at 9, to one side of a basin or condensate chamber 10 of the auxiliary conduit, such communication being best shown in Fig. 3. With the valve 6 closed or seated, the main conduit 7 constitutes a by-pass around the valve.

The valve 6 is placed in the valve chamber 4 through the upper open end thereof and a detachable cap 11 normally closes the open end of the valve chamber. This cap permits of the valve chamber 4 and the auxiliary conduit 1 being thoroughly cleansed from time to time, and it is also possible to remove the main conduit 7 when occasion requires.

The auxiliary conduit 1 has a lateral portion 2 thereof flanged or constructed so that it may be easily attached to the fuel outlet of an ordinary carbureter 12 of an internal combustion engine 13, and the valve chamber 4, preferably opposite the conduit connection therewith, has a flanged connection 14 so that it may be placed in direct communication with an intake manifold 15. The tube 8ª extends into the opening in the manifold and fuel may pass through the valve chamber, at low speed, without affecting the valve 6. By reference to Fig. 1, it will be noted that the intake manifold 15 forms a part or the upper portion of an exhaust manifold 16, said manifolds being separated by a partition or wall 17 that will be heated by the exhaust gases passing through the exhaust manifold.

When operating the engine 13 at a speed, for instance, below eight miles per hour for a vehicle equipped with the engine, the explosive mixture from the carbureter 12 is drawn through the lateral portion 2, into the basin 10 and then into the main conduit 7. From the main conduit the explosive mixture is drawn into the intake manifold 15 and the cylinders of the engine. When the explosive mixture enters the intake manifold 15, it is heated by the walls of said manifold and placed in better condition for ignition in the cylinders of the engine.

When the engine is idling or the throttle nearly closed the internal pressures on the top and bottom of the valve 6, are about equal, but when the throttle is open the pressures are unequal. The engine attempts to pull from the tube 8ª a greater volume of gas than can pass therethrough to supply the engine at increased speed, and in consequence of the greater lifting pressure on the top of the valve, said valve is unseated and an explosive mixture is drawn through the auxiliary conduit 1 into the valve chamber 4. At increased engine speed, the conduits 1 and 7 coöperate in supplying the explosive mixture to the engine and should any solid fuel be carried through the conduits into the intake manifold 15, the solid fuel is immediately vaporized to enter the engine cylinder in proper condition for ignition purposes. Should there be any condensate in the conduits 1 and 7, the basin 10 will collect the same. The basin 10 also serves as a sediment chamber, and by removing the conduit 7 the basin 10 can be easily cleaned.

The fuel supply intake connection may be used in connection with any carbureting, atomizing or vaporizing device, with any type of engine having an intake manifold or the equivalent thereof, and while in the drawing there is illustrated a preferred embodiment of my invention, it is to be understood that the structural elements are susceptible to such variations and modifications as fall within the scope of the appended claims.

What I claim:—

1. A fuel supply intake connection comprising an auxiliary conduit, a main conduit connecting the upper and lower ends of said auxiliary conduit, and a gravity valve in said auxiliary conduit between the end connections of said main conduit.

2. A fuel supply intake connection comprising an auxiliary conduit, a main conduit connecting the ends of said auxiliary conduit, a basin at the juncture of said main conduit with the lower end of said auxiliary conduit, and a check valve in said auxiliary conduit contiguous to the upper end thereof.

3. A fuel supply intake connection comprising an auxiliary conduit adapted to have the lower end thereof connected to a carbureter and the upper end thereof connected to an intake manifold, said auxiliary conduit having the upper end thereof enlarged to provide a valve chamber and an annular valve seat, a valve in the upper end of said conduit normally on the valve seat thereof adapted to be moved by a lifting pressure in the upper end of said conduit, and a main conduit providing a by-pass around said valve and normally establishing communication between the lower end of said conduit and an intake manifold.

4. A fuel supply intake connection comprising a normally closed auxiliary conduit having a basin at the lower end thereof, and a main conduit outside of said auxiliary conduit adapted for conducting fuel independent of said auxiliary conduit and having the lower end thereof connected to the basin of said auxiliary conduit and the upper end thereof extending through the upper end of said auxiliary conduit and detachable relative thereto.

In testimony whereof I affix my signature in the presence of two witnesses.

ALBERT PHINNEY.

Witnesses:
 ANNA M. DORR,
 KARL H. BUTLER.